US007834563B2

(12) United States Patent
Keuker et al.

(10) Patent No.: US 7,834,563 B2
(45) Date of Patent: Nov. 16, 2010

(54) DYNAMIC ANTENNA CONTROL IN A WIRELESS COMMUNICATION SYSTEM

(75) Inventors: Claus Martin Keuker, Tutzing (DE); Guenter Lothar Wolf, Nuremberg (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 991 days.

(21) Appl. No.: 11/618,164

(22) Filed: Dec. 29, 2006

(65) Prior Publication Data

US 2008/0158077 A1 Jul. 3, 2008

(51) Int. Cl.
*H02P 6/00* (2006.01)

(52) U.S. Cl. ........................... 318/34; 318/47; 318/119; 318/434; 318/66; 343/763; 343/766; 343/758

(58) Field of Classification Search ................. 318/434, 318/66, 34, 47, 119; 343/893, 725, 758, 343/763, 766
See application file for complete search history.

(56) References Cited

U.S. PATENT DOCUMENTS

| | | | | |
|---|---|---|---|---|
| 4,477,761 | A * | 10/1984 | Wolf | 318/800 |
| 4,811,033 | A * | 3/1989 | Ahl et al. | 343/880 |
| 5,570,546 | A * | 11/1996 | Butterworth et al. | 52/111 |
| 6,198,613 | B1 * | 3/2001 | Rozman | 361/93.1 |
| 6,445,353 | B1 * | 9/2002 | Weinbrenner | 343/763 |
| 6,680,878 | B1 * | 1/2004 | Minabe et al. | 369/24.01 |
| 7,174,731 | B2 * | 2/2007 | Okano | 62/183 |
| 7,564,624 | B2 * | 7/2009 | Leimbach et al. | 359/388 |
| 2004/0232864 | A1 * | 11/2004 | Sunaga et al. | 318/434 |
| 2005/0280378 | A1 * | 12/2005 | Suzuki | 318/80 |

* cited by examiner

*Primary Examiner*—Rita Leykin
(74) *Attorney, Agent, or Firm*—Williams, Morgan & Amerson

(57) ABSTRACT

The present invention provides a method for controllably moving a plurality of antennae in a wireless communications system. The method comprises activating a first and second actuator associated with a first and second one of the plurality of antennae to move the first and second antennae to a desired position. The power delivered to the first and second actuators is measured, and at least one parameter of at least one of the first and second actuators is reduced in response to the measured power being greater than a setpoint.

23 Claims, 4 Drawing Sheets

DYNAMIC ANTENNA CONTROL IN A WIRELESS COMMUNICATION SYSTEM

BACKGROUND OF THE INVENTION

1. Field of the Invention

This invention relates generally to communication systems, and, more particularly, to wireless communication systems.

2. Description of the Related Art

Conventional wireless communication systems include one or more base stations, which may also be referred to as node-Bs, for providing wireless connectivity to one or more mobile units, which may also be referred to using terms such as user equipment, subscriber equipment, and access terminals. Exemplary mobile units include cellular telephones, personal data assistants, smart phones, text messaging devices, laptop computers, desktop computers, and the like. Each base station may provide wireless connectivity via Radio Frequency (RF) signals to one or more mobile units in a geographical area, or cell, associated with the base station. For example, a base station that operates according to a Universal Mobile Telecommunication System (UMTS) protocol may provide wireless connectivity to one or more mobile units in a cell associated with the base station over a wireless communication link.

The wireless communications link typically includes one or more antennae mounted to a tower. In some applications, the antennae may be controllably tilted to change the Radio Frequency (RF) environment according to a predetermined plan or to accommodate dynamic changes in the RF environment. The antennae are typically equipped with actuators, such as RET actuators, which may be used to remotely control the positioning or tilt of a particular antenna.

Typically, the base station includes a bus system that carries electrical power for the actuators and other equipment (e.g., low-noise receive path amplifiers). Some devices within the base station need electrical power to provide their functionality, such as receive gain amplification or electrically driven RET actuators. Thus, it is useful if the power on the bus is not interrupted. Current interruption may occur if the current drawn by the devices within the base station exceeds the maximum available over the bus system. The current drawn by these devices can vary substantially, depending on the state of the device. For example, an idle RET actuator usually draws only a relatively small idle current, while an operating RET actuator can draw significantly more current. Other equipment draws current depending on their operational state, i.e. more current is drawn when the device has failed. In some prior art systems, operation of the devices may be scheduled to prevent excessive current draw. In particular, ordinarily only one RET actuator may be permitted to move at a time.

The disadvantage of this approach is that not all of the actuators that move the antennae of the same base station can be moved at the same time, and thus, negative effects to the RF environment are induced during the time any of the antennae is in the process of being positioned or tilted. This repositioning process can take up to several minutes, depending on the tilt angle change. Accordingly, periods of poor performance may be experienced while each of the antennae is repositioned.

Another disadvantage is that a single point of failure exists for the power management of the bus. If an overcurrent situation arises, a loss of power on the bus can cause the low noise receive amplifiers or electrically driven RET actuators to stop working. For RET actuators, the loss of power can result in lost calibration information, which in turn requires re-calibration of the RET actuator. Until re-calibration can be effected, the base station may interfere with neighboring cells or the affected cell may experience a loss of service.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for controlling a plurality of actuators. The method comprises activating a first and second one of the actuators to move to a desired position. The power delivered to the first and second actuators is measured, and at least one parameter of at least one of the first and second actuators is reduced in response to the measured power being greater than a setpoint.

In another embodiment of the present invention, a method is provided for controllably moving a plurality of antennae in a wireless communications system. The method comprises activating a first and second actuator associated with a first and second one of the plurality of antennae s to move the first and second antennae to a desired position. The power delivered to the first and second actuators is measured, and at least one parameter of at least one of the first and second actuators is reduced in response to the measured power being greater than a setpoint.

BRIEF DESCRIPTION OF THE DRAWINGS

The invention may be understood by reference to the following description taken in conjunction with the accompanying drawings, in which like reference numerals identify like elements, and in which.

Figure 1:
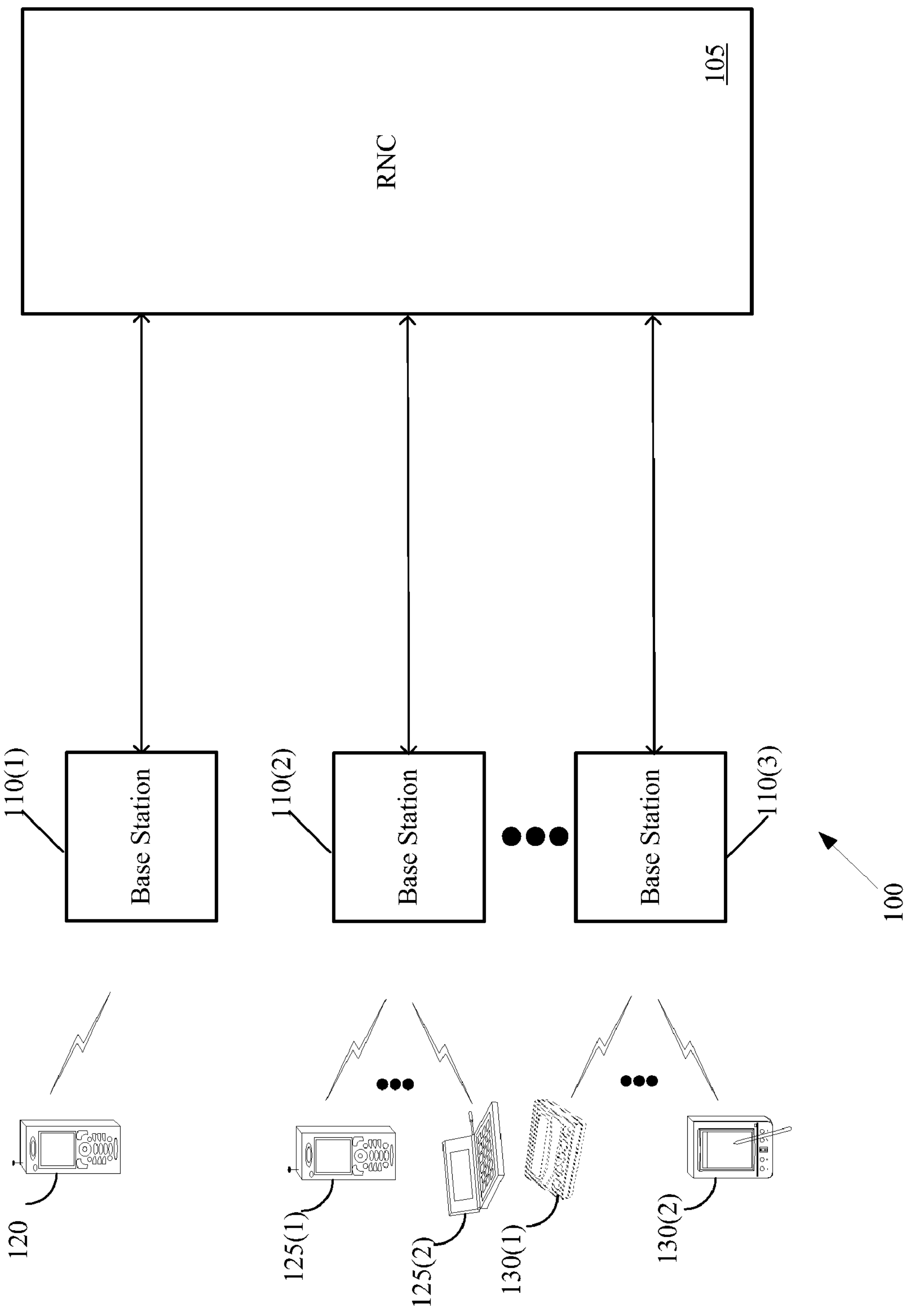
FIG. 1 conceptually illustrates one exemplary embodiment of a wireless communication system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one exemplary embodiment of a communication system 100. In the illustrated embodiment, the communication system 100 is a wireless communication system including a radio network controller 105. The communication system 100 and the radio network controller 105 may operate according to Universal Mobile Telecommunication Services (UMTS) protocols and may implement Orthogonal Frequency Division Multiple Access (OFDMA). However, persons of ordinary skill in the art having benefit of the present disclosure should appreciate that the present invention is not limited to communication systems that operate according to UMTS and/or OFDMA. In alternative embodiments, the communication system 100 may operate according to one or more other protocols including, but not limited to, the Global System for Mobile communication (GSM), Code Division Multiple Access (CDMA, CDMA 2000), and the like.

The radio network controller 105 is communicatively coupled to base stations 110(1-2). The indices (1-2) will be used hereinafter to refer to individual base stations and/or subsets of base stations. However, in the interest of clarity, the indices (1-2) may be dropped when the base stations 110 are referred to collectively. This convention will also be applied hereinafter to other elements that are referred to using a single reference number and one or more indices. The base stations 110 may provide wireless connectivity to corresponding geographical areas or cells. As discussed above, the base stations 110 may provide wireless connectivity according to UMTS protocols and may implement OFDMA, but the base stations 110 are not limited to these protocols. In the illustrated embodiment, the base station 110(1) provides wireless connectivity to a mobile unit 120, the base station 110(2) provides wireless connectivity to mobile units 125(1-2), and the base station 110(3) provides wireless connectivity to the mobile units 130(1-2). However, persons ordinary skill in the art having benefit of the present disclosure should appreciate that the base stations 110 may provide wireless connectivity to any number of mobile units at any location within or proximate to the cells.

Figure 2:
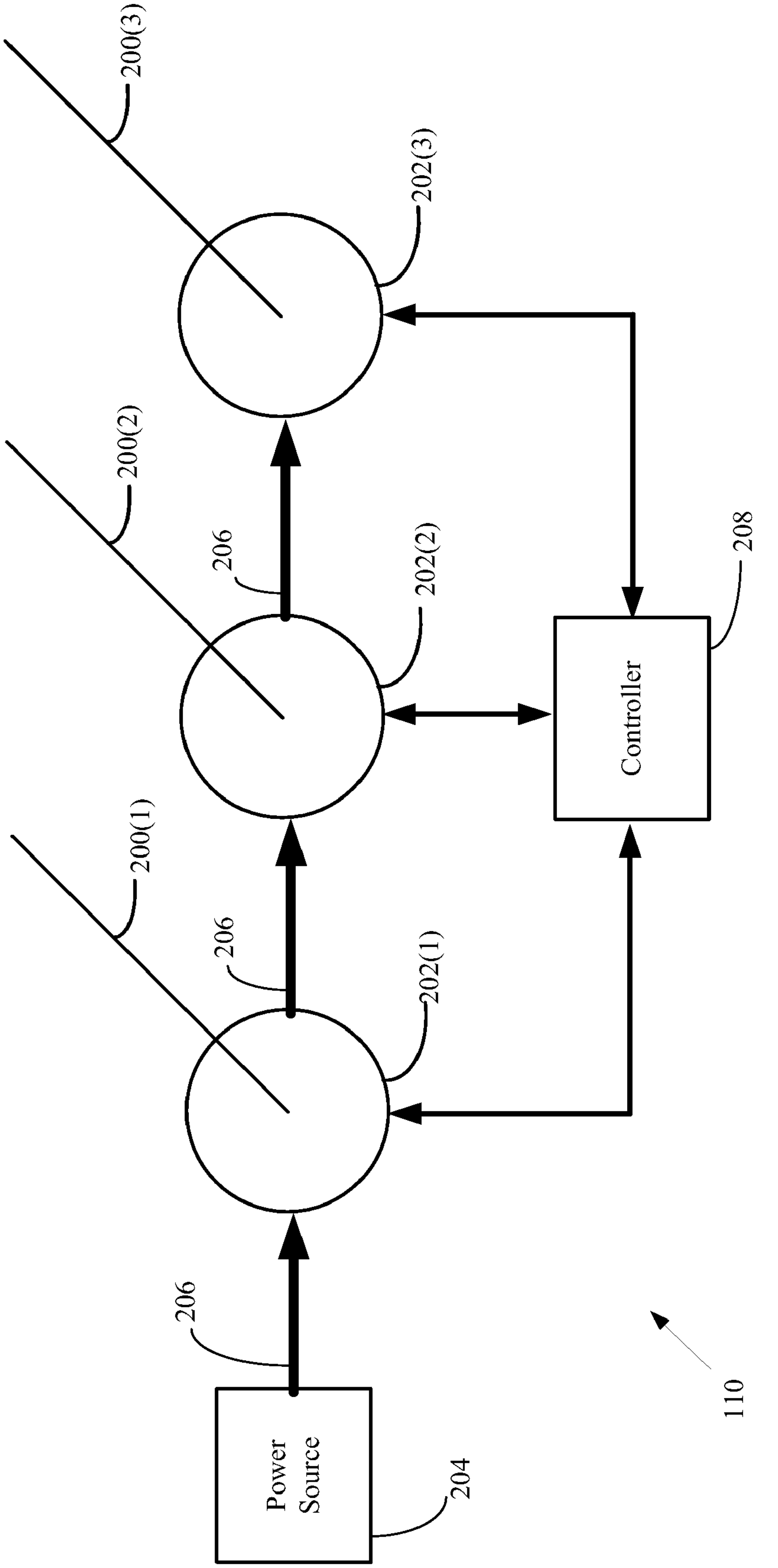
FIG. 2 conceptually illustrates one exemplary embodiment of a multiple-antenna base station, in accordance with the present invention.

FIG. 2 conceptually illustrates one exemplary embodiment of the base station 110 with a plurality of antennae 200 (1-3) associated therewith. The antennae may each be controllably positioned by a set of RET actuators 202(1-3). Power from a source 204 for the RET actuators 202(1-3) is supplied over a bus 206, interconnecting the RET actuators 202(1-3) in a daisy chain configuration. To prevent an overcurrent situation, each of the RET actuators 202(1-3) is configured to measure the current power consumption on the daisy chained bus 206. In one embodiment of the instant invention, the current power consumption may be determined based on a measurement of the amount of current flowing through the bus 206 to the actuators 202(1-3). Using the measured current power consumption, a controller 208 may alter the operation of one or more of the actuators 202(1-3) to maintain the current power consumption below a configuration value. For example, the controller 208 may reduce the operating speed of one or more of the actuators 202(1-3) to reduce power consumption. Those skilled in the art will appreciate that the current power consumption may be reduced by reducing the speed, or even stopping, one of the actuators 202(1-3). Alternatively, the speed of multiple actuators may be similarly slowed to reduce the overall power consumption. That is, in one embodiment of the instant invention, the speed of the actuators 202(1-3) may be varied in like manner to maintain their movement substantial synchronized.

Figure 3:
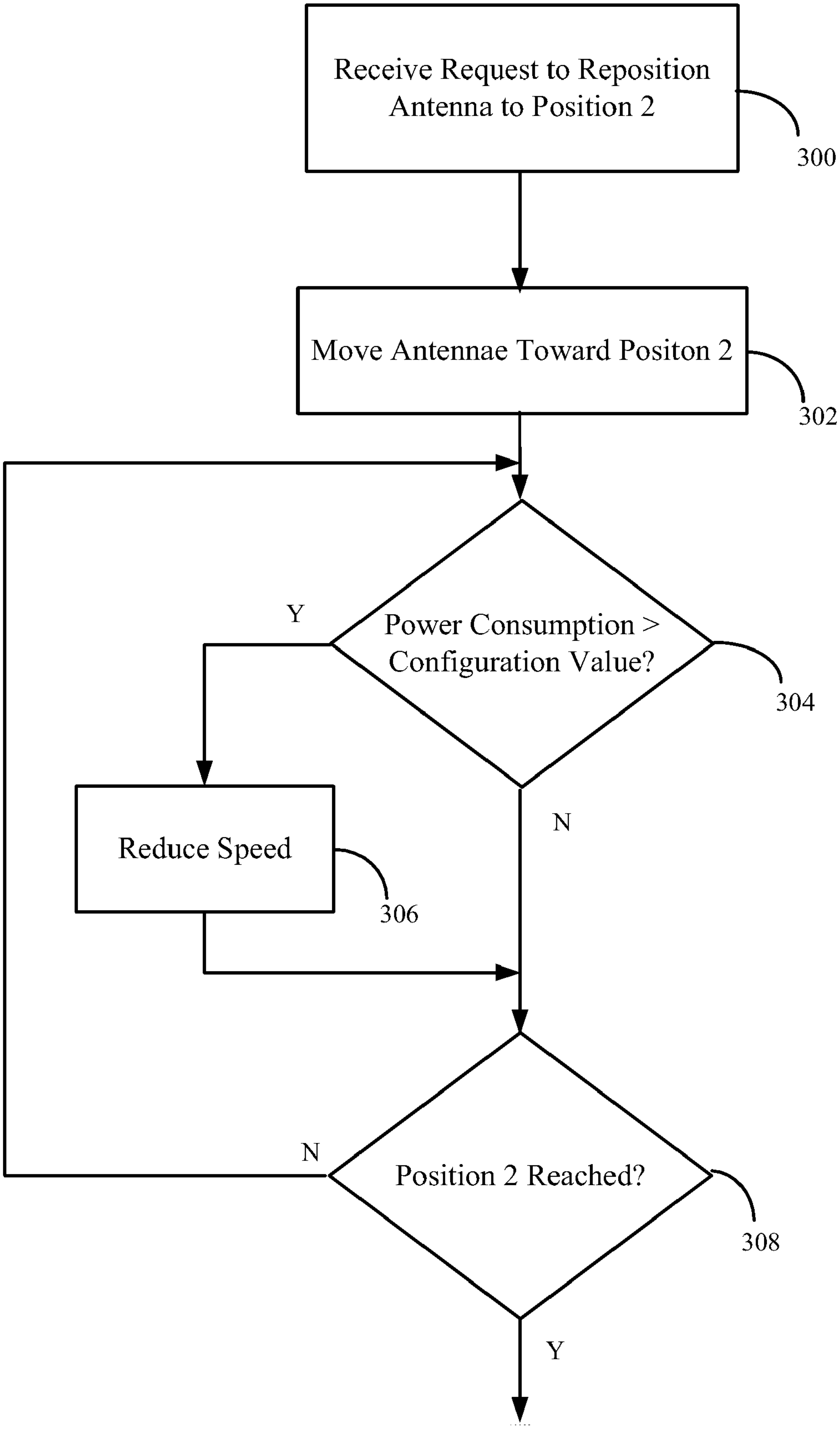
FIG. 3 conceptually illustrates one exemplary embodiment of a flow chart representation of a control routine that may be implemented to control the amount of power consumed by a set of actuators associated with the multiple-antenna base station of FIG. 2.

One exemplary embodiment of a routine that may be implemented in the controller 208 is stylistically represented in flow chart form in FIG. 3. The process begins at block 300 where the controller 208 receives a request to reposition the antennae 200(1-3) to a new position, such as Position 2. At block 302, the controller 208 instructs at least two of the actuators 202(1-3) to begin movement toward Position 2. In some embodiments of the instant invention, it may be useful and possible to move all of the antennae 202(1-3) substantially simultaneously toward Position 2. In other embodiments, it may be useful to move less than all of the antennae 200(1-3) at the same time. For example, in one embodiment, it may be useful to move only two of the antennae 200(1-2) at the same time, moving the third antennae 200(3) thereafter.

Figure 4:
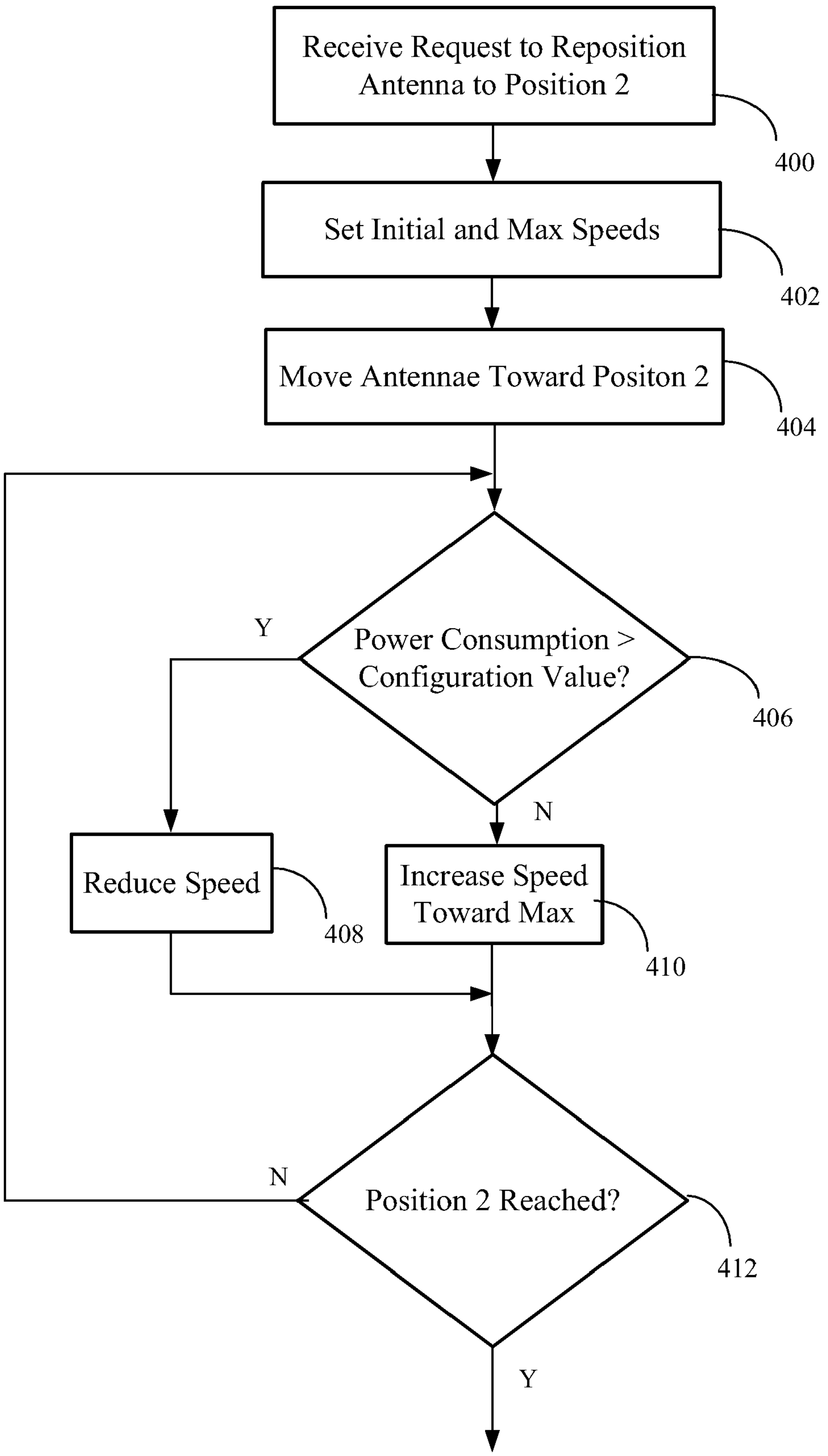
FIG. 4 conceptually illustrates an alternative exemplary embodiment of a flow chart representation of a control routine that may be implemented to control the amount of power consumed by a set of actuators associated with the multiple-antenna base station of FIG. 2.

At decision block 304, the power consumption measured by the actuators 202(1-3) is compare to the configuration value. If the configuration value is exceeded, then control transfers to block 306 where the power consumed by the actuators 202(1-3) is reduced, such as by decreasing the speed of movement of the actuators 202(1-3). Thereafter, control transfers to decision block 308, where the controller 208 checks to determine if the antennae 200(1-3) has reached Position 2. If not, control transfers back to block 302 where the actuator 202(1-3) continues movement toward Position 2. On the other hand, if the antennae 200(1-3) have reached Position 2, then the control routine terminates An alternative exemplary embodiment of a routine that may be implemented in the controller 208 is stylistically represented in flow chart form in FIG. 4. Generally, the embodiment illustrated in FIG. 4 is similar to the embodiment illustrated in FIG. 3, differing principally in that the speed of the actuators 202(1-3) is controllably increased in steps to a final value. The process beings at block 400 where the controller 208 receives a request to reposition the antennae 200 (1-3) to a new position, such as Position 2. At block 402, the controller sets the initial speed and the maximum speed at which the actuators 202(1-3) may be moved. Thereafter, at block 404, the controller 208 instructs at least two of the actuators 202(1-3) to begin movement toward Position 2 at the initial speed. In some embodiments of the instant invention, it may be useful and possible to move all of the antennae 202(1-3) substantially simultaneously toward Position 2. In other embodiments, it may be useful to move less than all of the antennae 200(1-3) at the same time. For example, in one embodiment, it may be useful to move only two of the antennae 200(1-2) at the same time, moving the third antennae 200(3) thereafter.

At decision block 406, the power consumption measured by the actuators 202(1-3) is compared to the configuration value. If the configuration value is exceeded, then control transfers to block 408 where the power consumed by the actuators 202(1-3) is reduced, such as by reducing the speed of movement of the actuators 202(1-3). Thereafter, control transfers to decision block 412, where the controller 208 checks to determine if the antennae 200(1-3) has reached Position 2. If not, control transfers back to block 406 where the actuators 202(1-3) continues movement toward Position 2 at the now reduced speed. On the other hand, if the antennae 200(1-3) have reached Position 2, then the control routine terminates.

Alternatively, if it is determined at decision block 406 that the measured power consumption is less than the configuration value, then control transfers to block 410 where the speed of the actuators 202(1-3) is increased toward the maximum speed. Thereafter, if Position 2 has not been reached, then control transfers back to block 406 where the process is repeated at the increased speed.

During this time, the power consumption on the bus has to be monitored and the maximal motor speed has to be regularly recalculated to cater for situations where other actuators start to move at the same time.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for controlling a plurality of actuators, comprising:

- activating a first and second one of the actuators for substantially synchronized movement to a desired position;
- measuring the power delivered to the first and second actuators over a bus coupled in a daisy chain fashion to the first and second actuators; and
- reducing at least one parameter of at least one of the first and second actuators in response to the measured power being greater than a setpoint.

2. A method, as set forth in claim 1, wherein power is supplied to the first and second actuators over a bus, and wherein measuring the power supplied to the first and second actuators includes measuring the current flowing through the bus.

3. A method, as set forth in claim 1, wherein measuring the power supplied to the first and second actuators further comprises measuring the current flowing through the bus.

4. A method, as set forth in claim 1, wherein reducing at least one parameter of at least one of the first and second actuators in response to the measured power being greater than the setpoint further comprises reducing the speed of at least one of the first and second actuators in response to the measured power being greater than the setpoint.

5. A method, as set forth in claim 1, wherein reducing at least one parameter of at least one of the first and second actuators in response to the measured power being greater than the setpoint further comprises reducing the speed of both of the first and second actuators in response to the measured power being greater than the setpoint.

6. A method, as set forth in claim 1, wherein reducing at least one parameter of at least one of the first and second actuators in response to the measured power being greater than the setpoint further comprises ceasing movement of one of the first and second actuators in response to the measured power being greater than the setpoint.

7. A method for controlling a plurality of actuators, comprising:

- activating a first and second one of the actuators to move to a desired position, wherein activating the first and second actuators to move to the desired position further comprises activating the first and second actuators to increase speed as a function of time;

measuring the power delivered to the first and second actuators; and reducing at least one parameter of at least one of the first and second actuators in response to the measured power being greater than a setpoint.

8. A method, as set forth in claim 7, wherein activating the first and second actuators to increase speed as a function of time further comprises activating the first and second actuators to increase speed in a series of steps over a preselected period of time.

9. A method, as set forth in claim 8, wherein reducing at least one parameter of at least one of the first and second actuators in response to the measured power being greater than the setpoint further comprises reducing the speed of at least one of the first and second actuators in a series of steps over time until the measured power falls below the setpoint.

10. A method for controllably moving a plurality of antennae in a wireless communications system, comprising:

activating a first and second actuator associated with a first and second one of the plurality of antennae for substantially synchronized movement of the first and second antennae to a desired position;

measuring the power delivered to the first and second actuators over a bus coupled in a daisy chain fashion to the first and second actuators; and reducing at least one parameter of at least one of the first and second actuators in response to the measured power being greater than a setpoint.

11. A method, as set forth in claim 10, wherein power is supplied to the first and second actuators over a bus, and wherein measuring the power supplied to the first and second actuators includes measuring the current flowing through the bus.

12. A method, as set forth in claim 10 wherein measuring the power supplied to the first and second actuators further comprises measuring the current flowing through the bus.

13. A method, as set forth in claim 10, wherein reducing at least one parameter of at least one of the first and second actuators in response to the measured power being greater than the setpoint further comprises reducing the speed of at least one of the first and second actuators in response to the measured power being greater than the setpoint.

14. A method, as set forth in claim 10, wherein reducing at least one parameter of at least one of the first and second actuators in response to the measured power being greater than the setpoint further comprises reducing the speed of both of the first and second actuators in response to the measured power being greater than the setpoint.

15. A method, as set forth in claim 10, wherein reducing at least one parameter of at least one of the first and second actuators in response to the measured power being greater than the setpoint further comprises ceasing movement of one of the first and second actuators in response to the measured power being greater than the setpoint.

16. A method for controllably moving a plurality of antennae in a wireless communications system, comprising:

activating a first and second actuator associated with a first and second one of the plurality of antennae s to move the first and second antennae to a desired position, wherein activating the first and second actuators further comprises activating the first and second actuators to increase speed as a function of time;

measuring the power delivered to the first and second actuators over a bus coupled in a daisy chain fashion to the first and second actuators; and reducing at least one parameter of at least one of the first and second actuators in response to the measured power being greater than a setpoint.

17. A method, as set forth in claim 16, wherein activating the first and second actuators to increase speed as a function of time further comprises activating the first and second actuators to increase speed in a series of steps over a preselected period of time.

18. A method, as set forth in claim 17, wherein reducing at least one parameter of at least one of the first and second actuators in response to the measured power being greater than the setpoint further comprises reducing the speed of at least one of the first and second actuators in a series of steps over time until the measured power falls below the setpoint.

19. A method, comprising:

coordinating current power consumption of a plurality of actuators coupled in a daisy chain fashion to a bus so that current power consumption remains below a configuration value for the bus.

20. The method of claim 19, wherein coordinating the current power consumption of the plurality of actuators comprises modifying the current power consumption of at least one of the plurality of actuators to maintain the current power consumption below the configuration value.

21. The method of claim 20, wherein modifying the current power consumption of at least one of the plurality of actuators comprises increasing speeds of the plurality of actuators until the current power consumption of the plurality of actuators exceeds the configuration value and then decreasing at least one speed of at least one of the plurality of actuators to reduce the current power consumption below the configuration value.

22. The method of claim 19, wherein each of the plurality of actuators is configured to position a corresponding antenna in a wireless communication system, and wherein coordinating the current power consumption of the plurality of actuators comprises coordinating the current power consumption of the plurality of actuators in response to a request to modify positions of the antennas.

23. The method of claim 19, wherein coordinating the power consumption of the plurality of actuators comprises modifying the current power consumption of at least one of the plurality of actuators in response to at least one additional actuator beginning to move concurrently with the plurality of actuators, said at least one additional actuator being coupled in a daisy chain fashion to the bus.

* * * * *